United States Patent [19]

Harman et al.

[11] 4,249,207
[45] Feb. 3, 1981

[54] PERIMETER SURVEILLANCE SYSTEM

[75] Inventors: R. Keith Harman, Kanata; John W. Patchell, Nepean, both of Canada

[73] Assignee: Computing Devices Company, Ottawa, Canada

[21] Appl. No.: 97,551

[22] Filed: Nov. 26, 1979

[30] Foreign Application Priority Data

Feb. 20, 1979 [CA] Canada .................................. 321857

[51] Int. Cl.³ ............................................ H04N 7/18
[52] U.S. Cl. .................................... 358/108; 358/105
[58] Field of Search ............................. 358/108, 105

[56] References Cited

U.S. PATENT DOCUMENTS

| | | | |
|---|---|---|---|
| 3,743,768 | 7/1973 | Copland | 358/108 |
| 3,988,533 | 10/1976 | Mick | 358/108 |
| 4,081,830 | 3/1978 | Mick | 358/108 |
| 4,160,998 | 7/1979 | Kamin | 358/108 |
| 4,198,653 | 4/1980 | Kamin | 358/108 |

Primary Examiner—Howard W. Britton
Attorney, Agent, or Firm—Wenderoth, Lind & Ponack

[57] ABSTRACT

Disclosed is an automatic video intrusion detection system. The system monitors a given area such as between two parallel fences. The image of the given area is divided into an array of cells each approximately equal in size to the image of a man. The video for each cell is integrated, digitized and stored in an array. Changes in cell values are detected and tracked so that changes in, say, 3 adjacent cells in a given direction, indicate an intruder. A microcomputer implements a tracking algorithm. Filtering discriminates against light level changes. The system is simpler than a known one which analyzes grey values of thousands of points in a video field.

16 Claims, 8 Drawing Figures

PERIMETER SURVEILLANCE SYSTEM

BACKGROUND OF THE INVENTION

This invention relates to an automatic video intrusion detection system.

A video intrusion detection system enables a given area to be monitored to detect persons trying to enter a prohibited area, such as between two parallel spaced apart fences. For example, it may be desired to detect persons trying to enter premises without authorization or to leave an area, such as a prison compound, without authorization. It will be understood that the term "intrusion" includes escape attempts in which case the would-be escapee still "intrudes" a forbidden area.

Some existing video intrusion detection devices have proved inadequate in an outdoor environment. Apparently they are effective in a controlled indoor environment but when used outdoors suffer from a very high nuisance alarm rate. Such things as trees moving in the wind, birds, the shadows of birds, cloud shadows, blowing paper and even insects near the camera can at times trip the alarm. In addition, considerable problems exist with lighting variation (both in time and space) and during rain and snow. Thus the problem is very complex and no solution can be expected to be perfect.

U.S. Pat. No. 3,988,533 of Mick et al, issued Oct. 26, 1976, discloses a video motion and intrusion detection system which samples a large number of points in each video field, for example 16,384 points. The digitized value of the grey scale of each point is stored and then, on a subsequent field of the same type, new digitized values of the points are compared with the stored values from the previous scan. If the difference exceeds a predetermined limit, an alarm is generated. The digital information provides the basis for an alarm map which may be displayed on a monitor. The system appears to be very complicated.

SUMMARY OF THE INVENTION

The present invention provides a simpler system which, instead of analyzing a huge number of "points", analyzes a relatively small number of "cells" which may be obtained by dividing a video frame in a grid pattern, e.g. 5×14 or 7×10 cells. Each cell is selected to be approximately equal in size to the area which a man's image would occupy. The video camera is located at one end of an area to be surveyed so that the image size of a man varies with distance from the camera; the cell sizes are similarly varied.

Two problems which can affect the operation of an automatic video intrusion detector are:

(1) achieving sufficient sensitivity to produce a high probability of detection, especially at night and during snow and rain.

(2) rejecting nuisance false alarms of the type discussed above.

The present invention goes a long way toward solving these problems.

The first problem is addressed by integrating the video signal in both time and space while the second problem is addressed by various means, such as:

(1) limiting the area of image processed, for example to that between two perimeter fences, (2) filtering in time to ensure that only targets which move within a certain velocity region are detected, (3) filtering in space to discriminate against targets which are much smaller or much larger than humans, (4) tracking of potential targets to discriminate against all targets which do not move in a direction from one fence to the other.

In some cases the area to be monitored may not be defined by actual fences but the principle can be the same; i.e. the area of image processed can be limited to that between two lines. In the preferred embodiment disclosed hereinafter the lines (fences) are parallel but it will be apparent to those skilled in the art that the lines could be non-parallel.

According to a broad aspect of the invention there is provided an automatic video intrusion detection system to detect targets comprising intruders moving more than a predetermined distance in a direction from one side to the other of an area to be monitored, said system comprising a television camera disposed to view a predetermined area which includes said area to be monitored, said television camera supplying a video image of said predetermined area to a preprocessor, said preprocessor having means for dividing into a predetermined number of cells a portion of said video image substantially corresponding to said area to be monitored, means for deriving integrated video intensity values for said cells and means for storing said integrated intensity values in an output buffer, said system further comprising computer means for periodically analyzing the values stored in said buffer to detect changes in said values exceeding a predetermined amount and to track changes in values for consecutive cells indicating movement of a target, said computer activating an alarm if changes in more than a predetermined number of adjacent cells are tracked in said direction.

DESCRIPTION OF THE PREFERRED EMBODIMENTS

Figure 1:
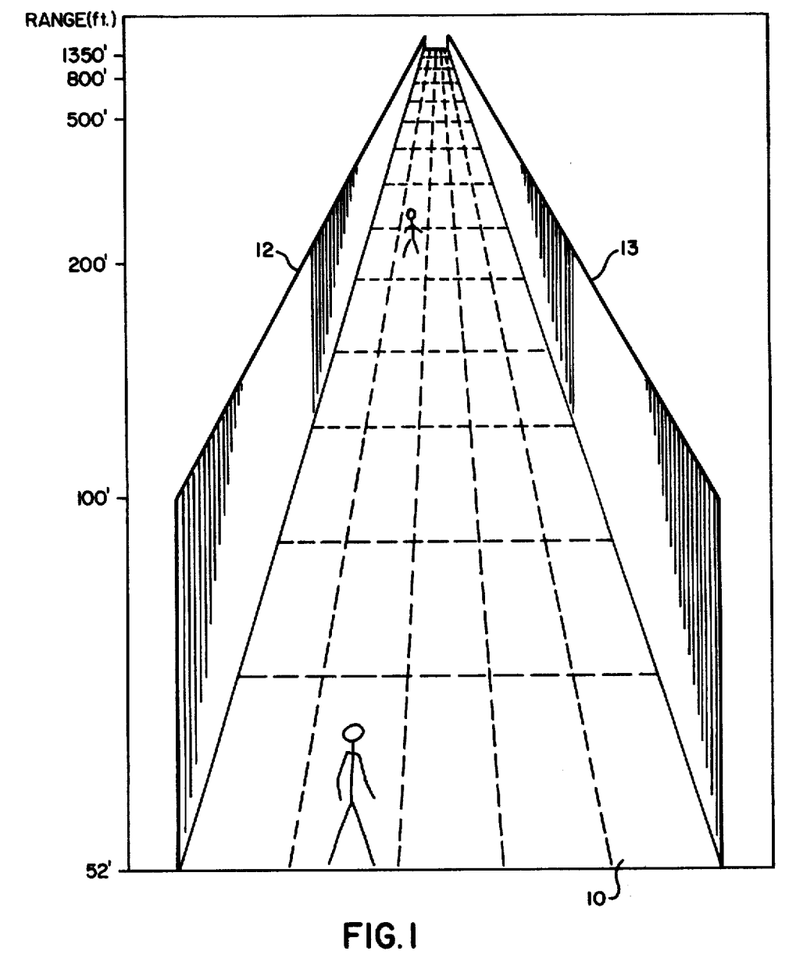
FIG. 1 is a diagram illustrating a video image of an area between two parallel fences to be monitored by the video detection system according to the invention, the image being divided into a plurality of regions or "cells".
Figure 2:
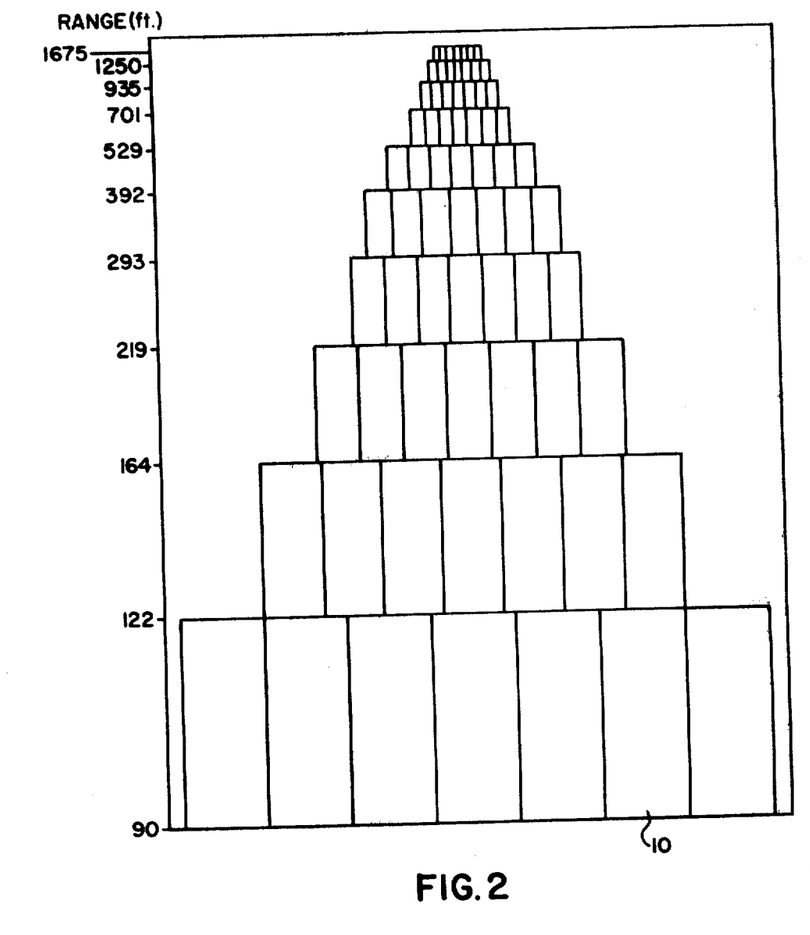
FIG. 2 illustrates an alternative way in which the area of the video image may be divided into regions.

Referring to FIG. 1, there is shown an area 10 between two fences 12 and 13 as seen by a television camera mounted at some distance above the area and some distance back from the near end. For example, the camera may be spaced about 52 feet back from the near end of the area 10, the area 10 being, for example, approximately 1,300 feet long. The video image is divided into a number of picture cells, each cell being of a size corresponding to the height of a man (6 feet) at the range occupied by the cell. Obviously, a man at the near end of the area 10 appears much larger than at the far end, and hence the cells of the image are bigger at the near end than at the far end. FIG. 1 shows an array of 5 by 14 cells, purely as an example. Other arrays, such as 7 by 10, may be used, as shown in FIG. 2.

Figure 3:
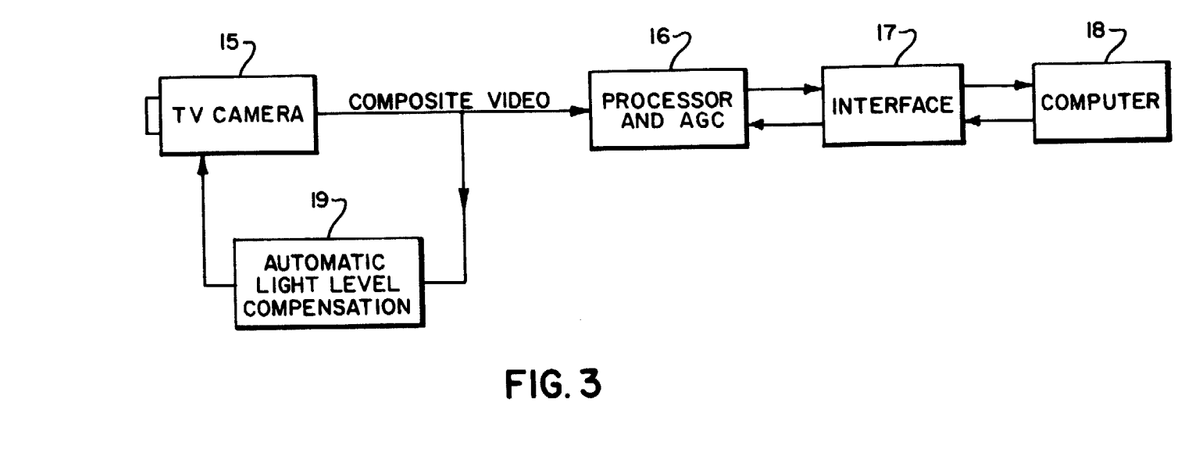
FIG. 3 is a block diagram of a video detection system according to the invention.

FIG. 3 shows a system block diagram. The television camera 15, which scans an area 10 such as shown in FIG. 1 or FIG. 2, feeds a video signal to a preprocessor and AGC 16. Part of the composite video output of television camera 15 is fed back through an automatic light level compensation circuit 19 to adjust the television camera to changing light conditions. The remainder of the composite video signal feeds the preprocessor 16 which converts the video signal from the television camera into 70 digital words representing the average brightness in a $10 \times 7$ array of picture cells (assuming the cell array of FIG. 2 is used). The information stored in the preprocessor 16 feeds a computer 18, preferably a microcomputer, via a suitable interface 17. The computer 18 analyzes the information from the preprocessor to detect an intruder.

Figure 4:
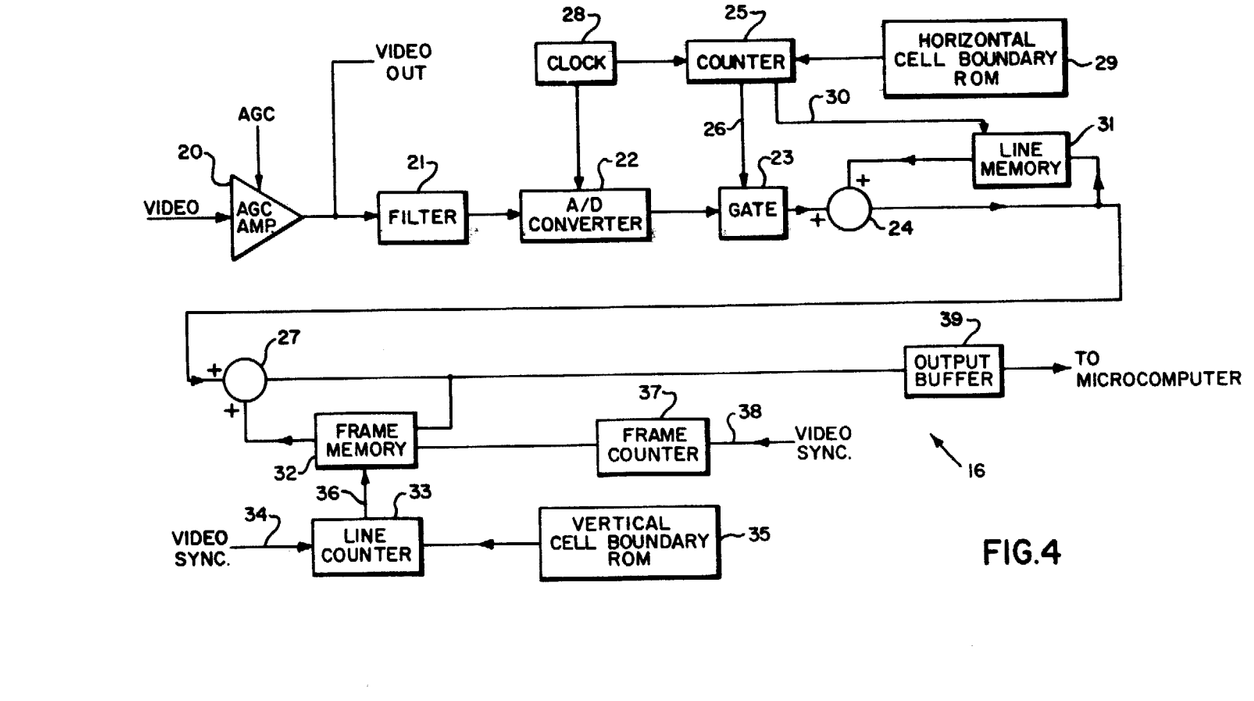
FIG. 4 is a block diagram of a preprocessor according to the invention.

FIG. 4 is a block diagram of the preprocessor 16 of FIG. 3. An AGC amplifier 20 is used to match the video dynamic range to the digitized dynamic range. Two adders, 24 and 27, are used to perform integration, horizontally and vertically, respectively, as will be explained. The video signal from AGC amplifier 20 is passed through a filter 21 and is converted into digital form in analog to digital (A/D) converter 22. The output of A/D converter 22 is fed via an AND gate 23 to one input of adder 24, gate 23 being enabled by an output of counter 25 on line 26. The output of counter 25 is controlled by clock 28 and ROM 29. ROM 29 stores the values of the horizontal cell boundaries and feeds these to counter 25 which compares them with the count of clock 28. When the clock value is between the values of the cell boundaries, counter 25 produces an output on its line 26 to enable gate 23. At the same time, it produces an output on line 30 to enable line memory 31.

The digitized information for each line of a cell from A/D converter 22 is added in adder 24 and fed back via line memory 31 to another input of adder 24. In this manner, the intensity values for each line of a cell are integrated. The integrated value is then fed to a second adder 27 which, in a manner to be described, adds up all the lines of a frame for each cell and feeds the resultant to frame memory 32.

Frame memory 32 is enabled by line counter 33 which compares a count of video horizontal sync. pulses on line 34 with the vertical cell boundaries stored in ROM 35. Thus when line counter 33 counts a certain number of horizontal sync. pulses equal to a number stored in ROM 35, the video scan has reached a vertical cell boundary and line counter 33 enables, via line 36, the frame memory 32 which feeds its data to one input of adder 27. The other input of adder 27 is fed by the output of adder 24. As further horizontal sync. pulses are counted by counter 33, a higher number will be reached equal to a number stored in ROM 35 indicating the end of one vertical cell boundary and the beginning of the next. Frame memory 32 switches to a new storage area for the next cell.

A frame counter 37 receives on its input line 38 vertical sync. pulses and counts a number of these pulses equal to a predetermined number of frames, e.g. 4 to 6 frames, after which it causes frame memory 32 to be read out into an output buffer 39. Output buffer 39 stores the integrated intensity values of each cell of the array from which they may be read by the microcomputor 18 (FIG. 3) for target detection and tracking.

The general purpose computer 18 (FIG. 3) implements detection and tracking. Various algorithms can be used by the computer to perform various functions such as automatic gain control (of amplifier 20), digital filtering of cell data, detection, target tracking and alarm setting. These functions are repeated every preprocessor cycle, i.e. every 4th to 6th TV frame or every 133 to 200 ms.

Figure 5:
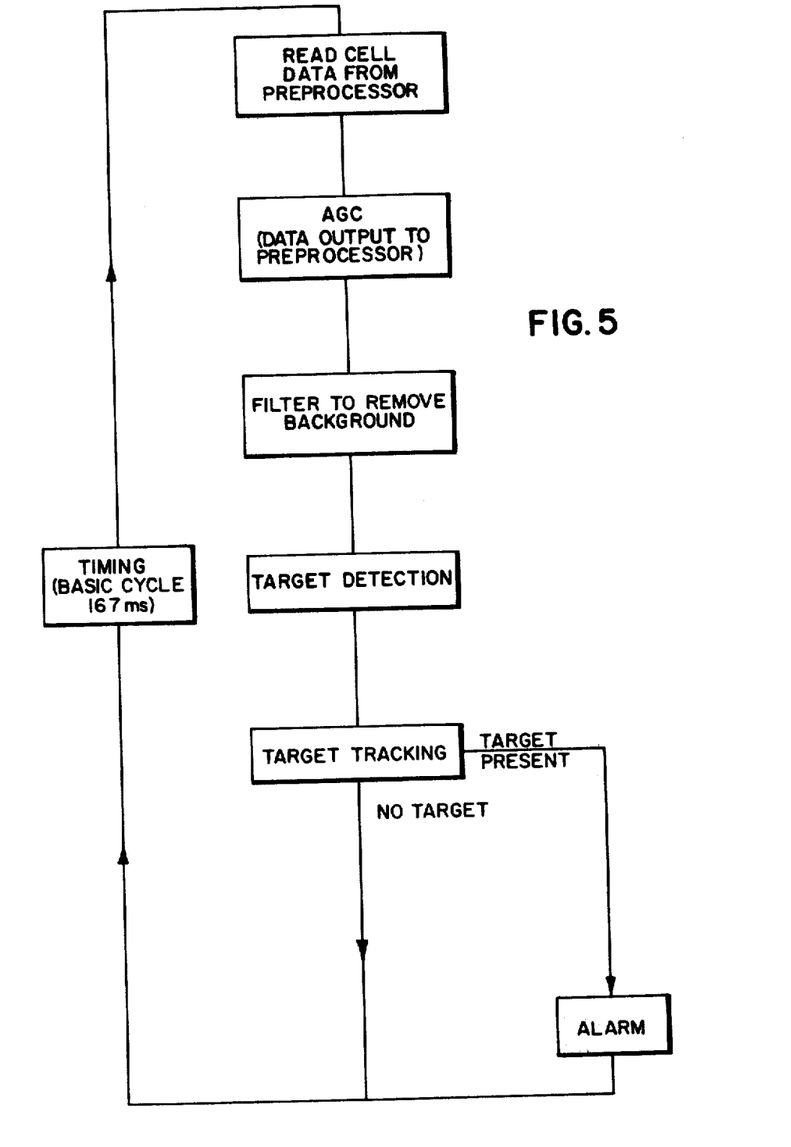
FIG. 5 is a functional block diagram of the processes carried out according to the invention.

The relative organization of these functions is illustrated in the flow diagram of FIG. 5, which is self-explanatory.

Automatic gain control is accomplished by averaging brightness and contrast over a period of time and using these values to set the offset and gain of the AGC amplifier 20 (FIG. 5). Additional outputs for lens iris or camera control may be provided if required. Constant contrast is preferably provided to compensate for differences between night and day, snow and bare ground, etc.

The data from the preprocessor 16 are filtered in time using a recursive digital low pass filter to determine average brightness. Choice of this parameter determines the minimum crossing speed at which targets will be detected. Too long a time constant results in an inability to adapt quickly to changing light conditions.

To detect the presence of a target, the preprocessor data for the current scan are compared with the filtered data; any significant changes are classified as targets. In order to discriminate against cloud shadows it is necessary to distinguish target size. To do this, the data are first examined to determine the number of significant changes in each row. If more than 3 targets are present it is assumed that lighting conditions have changed, and statistics are computed on the basis of all seven cells in the row. If, however, three or less cells have changed significantly then statistics are computed based only on those cells without significant changes. The statistics computed for each row are mean and standard deviation. In addition, the standard deviation is filtered in time to produce a sufficient statistic. Targets are then declared whenever the difference between a cell value and the mean for that row exceeds a set number times the standard deviation. This scheme has the following advantages:

Constant probability of false detection.
Discrimination against cloud shadows.
Detection of up to 3 targets in a single row (required to detect two or more people crossing together).

Target tracking is used to discriminate against all targets that do not cross the boundaries or which cross the boundaries too quickly to be a human. To be declared a target, a person must be tracked going across at least 3 columns. Note that a person can walk parallel to the fence without causing an alarm. Also objects which move too quickly across the field of view (such as birds, blowing paper, insects, etc.) will not be detected as they do not appear in adjacent cells. Thus tracking provides great immunity to nuisance false alarms.

Figure 6:
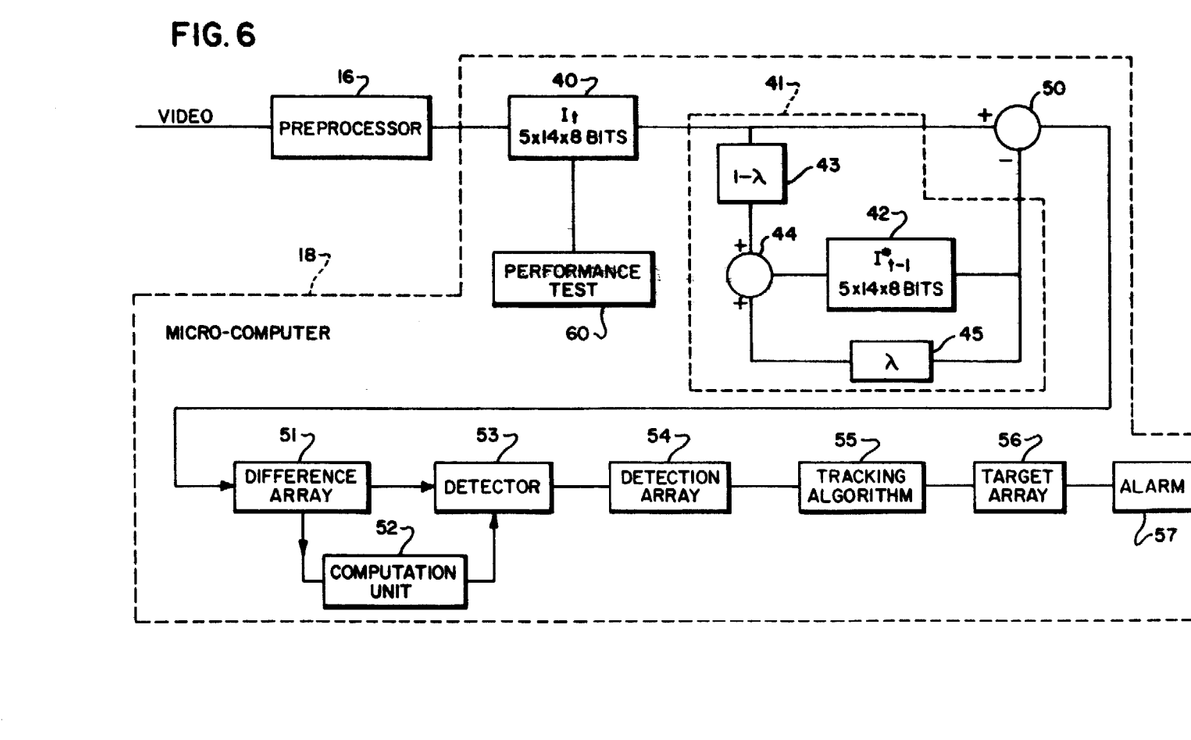
FIG. 6 is a functional block diagram of the invention.

FIG. 6 is a functional configuration of a preprocessor 16 and microcomputer 18 for an embodiment in which the area to be surveyed is divided into $5 \times 14$ cells. This configuration averages the image over each of these zones to produce a $5 \times 14$ array $I_t$. The number of picture elements averaged in each cell of $I_t$ varies from about 6,000 at the near end to about 12 at the far end of the area being surveyed. Obviously, a much greater SNR (signal to noise ratio) will be available at close ranges than for long ranges with consequent effects on probability of detection and system (as opposed to nuisance) false alarm rates.

The integration function is performed by the preprocessor as discussed in connection with FIG. 4. This may be accomplished either by digitizing the video directly and integrating digitally to produce a level for each cell or by gating sample and hold devices (one for each of the 70 elements) at the appropriate point in the horizontal scan and integrating by analogue means in the vertical direction. A low speed digitizer would then be used to digitize the results.

It is considered adequate to sample the scene ($I_t$) between 8 and 5 times per second or every fourth to sixth television frame. Depending on system requirements it may be desirable to integrate over the four to six frames to provide a gain in SNR or it may be possible to time share the preprocessor among several different cameras. (A typical installation would use eight cameras, two for each side of a perimeter to be guarded). Using this sampling rate effectively discriminates against fast moving targets. For example, a target moving faster than 1 cell per sample will skip at least 1 cell and not be tracked. One cell may equal, for example, 4 feet in width, which would mean a maximum detectable speed of about 20 feet per second. This is the simplest means of limiting the maximum detectable target speed.

Referring to FIG. 6, the output of the preprocessor 16 is sampled and stored in a store 40 of a microcomputer 18 as $I_t$. This value is then fed to a high pass filter 41 which discriminates against very slowly moving targets. This is accomplished by accumulating in a store 42 an averaged version of $I_t$, $$I^*_{t-1} = (1-\lambda)I_t + \lambda I^*_{t-2}$$

which represents the average brightness in each cell over a time period determined by $\lambda$. This time period could be, for example, one minute. Thus $I_t$ is multiplied by $(1-\lambda)$ in multiplier 43 and fed to one input of an adder 44, the output of which feeds the store 42. The output of store 42 is fed back through a multiplier 45 which multiplies the value from the store 42 by $\lambda$, the output of multiplier of 45 being fed to the other input of adder 44. The output of store 42 is $I^*_{t-1}$ and is fed as an input to a subtractor 50, the other input of which is derived from store 40. The output of subtractor 50 is the difference between $I_t$ and $I^*_{t-1}$. By obtaining this difference, which is stored in store 51, a difference array is produced which is compensated for slowly changing conditions such as variations in lighting. The difference array 51 consists of 5×14=70 members with from 8 to 12 bits dynamic range. Moving targets will correspond to elements of the array which deviate significantly from the average value.

The values d(x,y) stored in difference array 51 are fed to a computation unit 52 in the microcomputer which computes statistics comprising the means, m(x) and standard deviations, $\sigma(x)$ for each row (y). These statistics are compared in detector 53 with the data from difference array 51 by computing $d(x,y) - m(x) \geq K\sigma(x)$. Results greater than or equal to $K\sigma(x)$ are stored in detection array 54.

The means and standard deviations are computed so as not to include data from target cells. These cells are checked before the means and standard deviations are computed and up to three are eliminated if they show a large deviation from zero.

Figure 7:
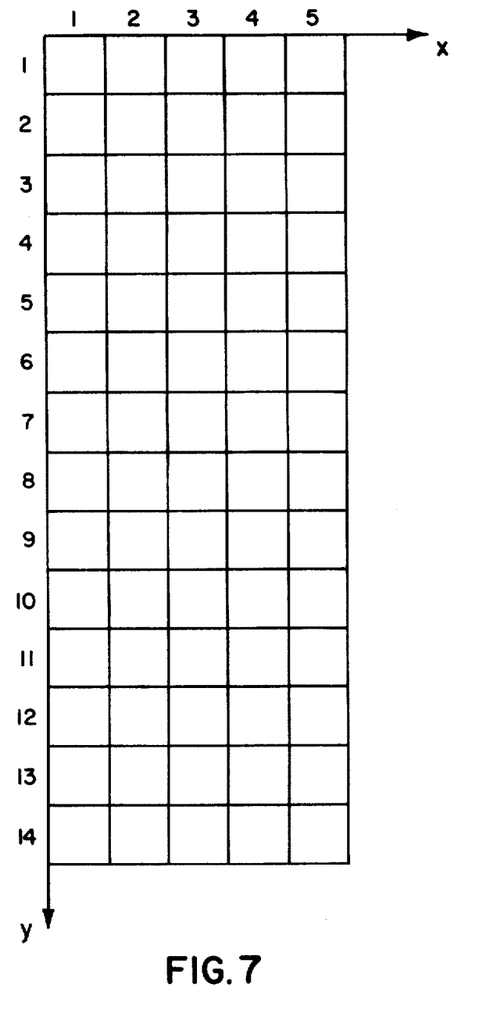
FIG. 7 illustrates a tracking algorithm target array.
Figure 8:
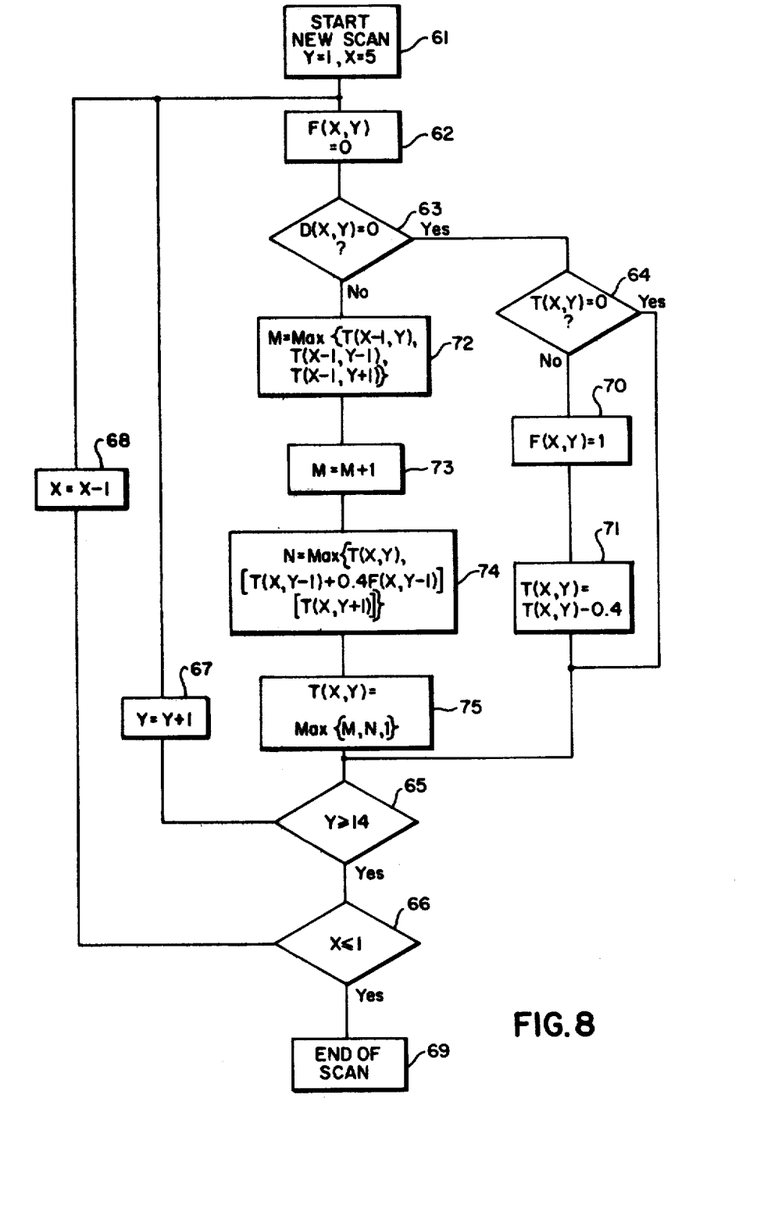
FIG. 8 is a tracking algorithm according to the invention.

The last stage in target recognition is tracking which is implemented in the microcomputer 18 by a tracking algorithm indicated by block 55 in FIG. 6 with the results being stored in target array T(x,y) which is referenced 56 in FIG. 6. An alarm 57 is given if an element of array T exceeds a predetermined threshold. This particular feature produces an acceptable nuisance alarm rate by greatly narrowing the class of objects that produce alarms. Tracking is achieved by storing the target array 54 (5×14) and recording in that array target history. FIG. 7 represents a target array T(x,y) and FIG. 8 shows a flow diagram of the tracking algorithm. Parameters used are:

x,y—position coordinates

F(x,y)—flag bit used to note old targets

D(x,y)—detection array. D is either zero (no target) or one (target) for each element. It is the output of the detection.

T(x,y)—target array. This array is updated by the algorithm for each new detection array (D(x,y)). T may have values from 0 to 5. An alarm is given whenever an element of T exceeds a preset threshold from 3 to 5.

M—Value of previous column targets.

N—Value of same column targets.

At the start of each tracking cycle (every 4th to 6th frame) the coordinates of the tracking array are initialized (61) and the tracking loop is entered. For a particular coordinate (x,y) in the tracking array the tracking is as follows. A flag bit is initialized (62) and the detector array 54 [D(x,y)] is tested to see if any targets have been detected at that coordinate during the current preprocessor cycle (63). If D(x,y)=0 (no detection) then the tracking array value is checked to see if a target was detected there during a previous cycle (64). If no target history is indicated [T(x,y)=0] then the coordinates are checked (65,66) and a new coordinate is set up (67,68) or the tracking loop is terminated (69). If at 64 T(x,y) was not zero (i.e. a target has been detected previously at that coordinate) then the flag is set to one (70) and the tracking value [T(x,y)] is decreased by a constant typically equal to 0.4 (71). Thus old targets are gradually erased from the tracking matrix. If a target has been detected on the current cycle then D(x,y)=1 (63) and a parameter M is calculated (72). This parameter establishes whether a target was previously detected in any of the adjoining cells in the previous column (x−1) and what its tracking matrix value was. The M value is augmented by one (73) to indicate an increase in target history. Next a value N is computed (74)

$$N = \text{Max}\{T(x,y), T(x,y-1) + 0.4F(x,y-1), T(x,y+1)\}$$

Thus largest of the test cell and the cell immediately above and below the test cell is determined. Note that the flag bit is used to modify the cell preceding the test cell as this may have been changed at 71. The target array is updated (75) to the largest of M, N or 1 and then the coordinates are tested and updated (65, 66, 68, 67) or the tracking cycle is completed (69). After each tracking cycle is complete the tracking array is tested against a threshold. Usually any tracking value between 3 and 5 would be considered to constitute an alarm.

Although the algorithm disclosed detects movement in one direction, it will be apparent to those skilled in the art that algorithms could be devised for tracking in both directions.

Although the invention has been described for use in detecting movement between two fences it will be apparent that it could be used for monitoring areas not clearly marked off by fences.

The system according to the invention is capable of testing its own performance. To do this, one sets up a target at the far end of the area being monitored, the target having a black area and a white area, each one cell wide. The data for these cells are taken from array 40 and a performance test done as indicated at 60, (FIG. 6) the test consisting of computing the contrast between the black and white areas. A decrease in contrast, as compared to a day with clear visibility, would then give a measure of atmospheric transmission which, of course, is influenced by fog, rain or snow.

Although the system has been described as using a television camera, it is not contemplated that the system is restricted to cameras sensitive to visible radiation. The system would work equally well with cameras sensitive to other types of radiation, e.g. infrared, provided they utilize a raster scan. Thus, the term "television camera" is intended to include cameras sensitive to other than visible radiation.

We claim:

1. An automatic video intrusion detection system to detect targets comprising intruders moving more than a predetermined distance in a direction from one side to the other of an area to be monitored, said system comprising a television camera disposed to view a predetermined area which includes said area to be monitored, said television camera supplying a video image of said predetermined area to a preprocessor, said preprocessor having means for dividing into a predetermined number of cells a portion of said video image substantially corresponding to said area to be monitored, means for deriving integrated video intensity values for said cells and means for storing said integrated intensity values in an output buffer, said system further comprising computer means for periodically analyzing the values stored in said buffer to detect changes in said values exceeding a predetermined amount and to track changes in values for consecutive cells indicating movement of a target, said computer activating an alarm if changes in more than a predetermined number of adjacent cells are tracked in said direction.

2. A system as claimed in claim 1 wherein said computer means includes means for filtering in time the data from said output buffer to determine average brightness so that only targets moving at more than a minimum speed will be detected.

3. A system as claimed in claim 2 wherein said predetermined number of cells are arranged in a grid pattern comprising rows and columns.

4. A system as claimed in claim 3 wherein said computer means interprets more than a predetermined number of targets in a row as being a change in lighting conditions rather than an intruder.

5. A system as claimed in claim 3 wherein said computer means computes statistics for each row of cells in the grid pattern comprising mean and standard deviation and provides a target indication when the difference between a cell value and the mean for that row exceeds a set number times the standard deviation.

6. A system as claimed in claim 5 wherein said computer means analyzes cell intensity values corresponding to every fourth to sixth frame of the television camera whereby very fast moving targets are discriminated against.

7. A system as claimed in claim 3 wherein said grid pattern comprises a 5×14 cell array and the predetermined number of targets is three.

8. A system as claimed in claim 1 wherein said preprocessor comprises an AGC amplifier which feeds the video signals from the television camera to an analog-to-digital (A/D) converter via a filter, said A/D converter feeding, via a gate, one input of a first adder, said first adder having an output which is fed back via a line memory to a second input of said first adder, said gate being controlled by a horizontal cell boundary read only memory (ROM) so that only data from the A/D converter corresponding to the area to be monitored is fed to said first adder, said first adder producing at its output integrated values for each line of a cell which are fed to one input of a second adder, said second adder having an output fed back via a frame memory to a second input of said second adder, said frame memory being controlled by a vertical cell boundary read-only memory to integrate line values from said first adder corresponding to vertical cell boundaries, the output of said second adder being fed to an output buffer which stores integrated intensity values for each cell.

9. A system as claimed in claim 8 wherein said computer means includes means for storing an array $I_t$ of intensity values, means for deriving averaged values of $I_t$, i.e. $I^*_{t-1}$, which represents the average brightness value over a period of time, means for obtaining the difference between values of $I_t$ and $I^*_{t-1}$ and storing them as a difference array, means utilizing the values stored in the difference array for computing statistics comprising the mean and standard deviation, means for comparing the values stored in the difference array with the statistics to detect differences exceeding a predetermined amount which are stored in a detection array.

10. A system as claimed in claim 9 wherein said computer includes means for analyzing the data stored in the detection array to track changes which are then stored in a target array.

11. A system as claimed in claim 7 wherein said preprocessor comprises an AGC amplifier which feeds the video signals from the television camera to an analog-to-digital (A/D) converter via a filter, said A/D converter feeding, via a gate, one input of a first adder, said first adder having an output which is fed back via a line memory to a second input of said first adder, said gate being controlled by a horizontal cell boundary read only memory (ROM) so that only data from the A/D converter corresponding to the area to be monitored is fed to said first adder, said first adder producing at its output integrated values for each line of a cell which are fed to one input of a second adder, said second adder having an output fed back via a frame memory to a second input of said second adder, said frame memory being controlled by a vertical cell boundary read-only memory to integrate line values from said first adder corresponding to vertical cell boundaries, the output of said second adder being fed to an output buffer which stores integrated intensity values for each cell.

12. A system as claimed in claim 11 wherein said computer means includes means for storing an array $I_t$ of intensity values, means for deriving averaged values of $I_t$, i.e. $I^*_{t-1}$, which represents the average brightness value over a period of time, means for obtaining the difference between values of $I_t$ and $I^*_{t-1}$ and storing them as a difference array, means utilizing the values stored in the difference array for computing statistics comprising the mean and standard deviation, means for comparing the values stored in the difference array with the statistics to detect differences exceeding a predetermined amount which are stored in a detection array.

13. A system as claimed in claim 12 wherein said computer includes means for analyzing the data stored in the detection array to track changes which are then stored in a target array.

14. A system as claimed in claim 1, 6 or 10 wherein said area to be monitored is defined by two parallel fences.

15. A system as claimed in claim 1, 3 or 6 including means for testing system performance comprising a fixed test target at the far end of the area to be monitored, said target being divided into a black area and a white area, and means for computing contrast of the images of said black and white areas whereby contrast variations with time provide an indication of changes in atmospheric transmission.

16. A system as claimed in claim 8, 9 or 10 including means for testing system performance comprising a fixed test target at the far end of the area to be monitored, said target being divided into a black area and a white area, and means for computing contrast of the images of said black and white areas whereby contrast variations with time provide an indication of changes in atmospheric transmission.

* * * * *